(12) United States Patent
Taniguchi et al.

(10) Patent No.: US 10,981,480 B2
(45) Date of Patent: Apr. 20, 2021

(54) VEHICLE SEAT AND COVER MEMBER

(71) Applicants: TS TECH CO., LTD., Saitama (JP); HONDA MOTOR CO., LTD., Tokyo (JP)

(72) Inventors: Hiromi Taniguchi, Tochigi (JP); Daisuke Okawa, Saitama (JP); Shoji Yamauchi, Mie (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/480,214

(22) PCT Filed: Jan. 24, 2018

(86) PCT No.: PCT/JP2018/002161
§ 371 (c)(1),
(2) Date: Jul. 23, 2019

(87) PCT Pub. No.: WO2018/139496
PCT Pub. Date: Aug. 2, 2018

(65) Prior Publication Data
US 2019/0366898 A1 Dec. 5, 2019

(30) Foreign Application Priority Data
Jan. 25, 2017 (JP) .............................. JP2017-011383

(51) Int. Cl.
*B60N 2/80* (2018.01)
*B60N 2/806* (2018.01)
(Continued)

(52) U.S. Cl.
CPC ............ *B60N 2/897* (2018.02); *B60N 2/809* (2018.02); *B60N 2002/899* (2018.02)

(58) Field of Classification Search
CPC ... B60N 2/809; B60N 2/897; B60N 2002/899
(Continued)

(56) References Cited

U.S. PATENT DOCUMENTS 5,080,437 A * 1/1992 Pesta ...................... B60N 2/818
297/410
5,445,434 A * 8/1995 Kohut ..................... B60N 2/826
297/391
(Continued)

FOREIGN PATENT DOCUMENTS

EP 2233045 A1 9/2010
JP 2002-087134 A 3/2002
(Continued)

OTHER PUBLICATIONS

International Search Report dated Apr. 17, 2018 for the corresponding PCT Application No. PCT/JP2018/002161, with translation.
(Continued)

*Primary Examiner* — Rodney B White
(74) *Attorney, Agent, or Firm* — Michael Best & Friedrich LLP

(57) ABSTRACT

To reduce the damage to the inner portion of a seat back caused by the mounting part of a headrest on the seat back. A vehicle seat (S) includes a headrest guide (6) having an insertion hole (6A) into which a headrest stay (12) of a headrest (S3) is inserted, a holder (8) mounted on a seat back frame (2) and configured to hold the headrest guide (6), and a cover member (10) configured to cover at least a part of the outer surfaces of the headrest guide (6) and the holder (8) and detachable from the seat back frame (2).

11 Claims, 15 Drawing Sheets

(51) Int. Cl.
*B60N 2/809* (2018.01)
*B60N 2/812* (2018.01)
*B60N 2/818* (2018.01)
*B60N 2/897* (2018.01)

(58) Field of Classification Search
USPC .................................................. 297/391, 410
See application file for complete search history.

(56) References Cited

U.S. PATENT DOCUMENTS

| | | | | |
|---|---|---|---|---|
| 5,788,250 | A * | 8/1998 | Masters | B60N 2/826 |
| | | | | 297/410 |
| 5,816,658 | A * | 10/1998 | Wallis | B60N 2/815 |
| | | | | 297/410 |
| 6,099,077 | A * | 8/2000 | Isaacson | B60N 2/818 |
| | | | | 297/410 |
| 6,948,773 | B2 * | 9/2005 | Yetukuri | B60N 2/80 |
| | | | | 297/410 |
| 7,338,130 | B2 * | 3/2008 | Daume | B60N 2/815 |
| | | | | 297/410 |
| 7,410,219 | B2 * | 8/2008 | Kraft | B60N 2/809 |
| | | | | 297/410 |
| 7,905,551 | B2 * | 3/2011 | Sung | B60N 2/68 |
| | | | | 297/391 X |
| 7,954,899 | B2 * | 6/2011 | Chen | B60N 2/809 |
| | | | | 297/410 |
| 8,109,570 | B2 * | 2/2012 | Nishiura | B60N 2/818 |
| | | | | 297/410 X |
| 8,864,235 | B2 * | 10/2014 | Menges | A47C 7/38 |
| | | | | 297/404 |
| 8,876,211 | B2 * | 11/2014 | Tscherbner | B60N 2/815 |
| | | | | 297/410 |
| 8,967,721 | B2 * | 3/2015 | Muto | B60N 2/824 |
| | | | | 297/410 |
| 9,446,692 | B2 * | 9/2016 | Hagan | F16C 29/10 |
| 9,649,959 | B2 * | 5/2017 | Hagan | B60N 2/818 |
| 9,707,872 | B2 * | 7/2017 | Hagan | F16C 33/1095 |
| 9,902,301 | B2 * | 2/2018 | Aquillue | B60N 2/80 |
| 10,099,589 | B2 * | 10/2018 | Takeuchi | B60N 2/897 |
| 10,144,328 | B2 * | 12/2018 | Hagan | F16C 29/005 |
| 2003/0111889 | A1 * | 6/2003 | Meshke | B60N 2/809 |
| | | | | 297/391 |
| 2005/0012374 | A1 * | 1/2005 | Isaacson | B60N 2/815 |
| | | | | 297/410 |
| 2009/0315368 | A1 * | 12/2009 | Mitchell | B60R 11/02 |
| | | | | 297/188.04 |
| 2010/0276978 | A1 | 11/2010 | Furuta et al. | |
| 2011/0025116 | A1 * | 2/2011 | Ledieu | B60N 2/818 |
| | | | | 297/391 |
| 2011/0210594 | A1 * | 9/2011 | Eisenbraun | B60N 2/809 |
| | | | | 297/391 |
| 2012/0007404 | A1 * | 1/2012 | Tscherbner | B60N 2/815 |
| | | | | 297/391 |
| 2012/0080925 | A1 * | 4/2012 | Steinmetz | B60N 2/818 |
| | | | | 297/391 |
| 2014/0062159 | A1 * | 3/2014 | Kim | A47C 7/38 |
| | | | | 297/410 |
| 2014/0361595 | A1 * | 12/2014 | Weiland | B60N 2/844 |
| | | | | 297/410 |
| 2016/0176324 | A1 * | 6/2016 | Otto | F16C 29/02 |
| | | | | 297/391 |
| 2016/0200229 | A1 * | 7/2016 | Boesl | B60N 2/806 |
| | | | | 297/391 |
| 2017/0136924 | A1 * | 5/2017 | Wehling | B60N 2/809 |

FOREIGN PATENT DOCUMENTS

| | | |
|---|---|---|
| JP | 2009-183695 A | 8/2009 |
| JP | 2010-228613 A | 10/2010 |
| JP | 2011-178293 A | 9/2011 |

OTHER PUBLICATIONS

Extended European Search Report dated Dec. 11, 2019 for the corresponding European patent application No. 18744348.6.

* cited by examiner

VEHICLE SEAT AND COVER MEMBER

CROSS-REFERENCE TO RELATED APPLICATIONS

This application is entering into the national phase of International Application No. PCT/JP2018/002161, filed on Jan. 24, 2018. Further, this application claims the benefit of priority from Japanese Patent Application No. 2017-011383, filed on Jan. 25, 2017, the entire contents of which are incorporated herein by reference.

TECHNICAL FIELD

The present invention relates to a vehicle seat and a cover member that can reduce the damage to the inner portion of a seat back caused by the mounting part of a headrest on the seat back.

BACKGROUND ART

In a vehicle seat, a headrest with which an occupant's head is contacted is detachably mounted on a seat back that is a backrest surface. For example, in Patent Literature 1 below, a headrest is mounted on a seat back by a mechanism in which a holder holds a guide into which two stays hanging down from the headrest is inserted, the holder being fixed to a seat back frame forming the skeletal frame of the seat back.

CITATION LIST

Patent Literature

PATENT LITERATURE 1: JP 2011-178293 A

SUMMARY OF INVENTION

Technical Problem

In rear-end collision of a vehicle, the edge of the guide or the holder that mounts the headrest on the seat back is strongly pushed against a cushion material in the inside of the seat back, and this sometimes damages the cushion material in the inside of the seat back.

The present invention is made in view of the problem. An object is to provide a vehicle seat and a cover that can reduce the damage to the inner portion of a seat back caused by the mounting part of a headrest on the seat back.

Solution to Problem

The problem is solved by a vehicle seat including a headrest and a seat back, the vehicle seat including: a guide having an insertion hole into which a stay of the headrest is inserted; a holder mounted on a seat back frame forming a skeletal frame of the seat back, the holder being configured to hold the guide; and a cover member configured to cover at least a part of an outer surface of the guide and an outer surface of the holder, the cover member being detachable from the seat back frame.

The problem is solved by a cover member configured to cover at least a part of an outer surface of the guide and an outer surface of the holder, the cover member being detachable from the seat back frame, the guide having an insertion hole into which a stay of a headrest included in a vehicle seat is inserted, the holder mounted on a seat back frame forming a skeletal frame of a seat back included in the vehicle seat, the holder being configured to hold the guide.

According to the vehicle seat and the cover member described above, the damage to the inner portion of the seat back caused by the mounting part of the headrest on the seat back in rear-end collision can be reduced. In rear-end collision, impact absorbability near the occupant's neck can be improved. According to the vehicle seat and the cover member described above, the uncomfortable feeling on the occupant at the place where the mounting mechanism of the headrest on the seat back is provided can be reduced. The above-described cover member is easily replaced, and hence the ease of maintenance can be enhanced.

In the vehicle seat above, the cover member may have a region covering a top end to a lower end of the holder on a seat front side.

With this configuration, in rear-end collision, the damage to the inner portion of the seat back caused by the end portion of the holder on the seat front side can be reduced.

In the vehicle seat above, the cover member may cover a lower end of the guide on a seat front side.

With this configuration, in rear-end collision, the damage to the inner portion of the seat back caused by the lower end of the guide can be reduced. According to the configuration above, an uncomfortable feeling on the occupant imparted by the lower end of the guide can be reduced.

In the vehicle seat above, the cover member may be in contact with the guide. With this configuration, a rattle of the cover member can be suppressed.

In the vehicle seat above, the cover member may have an annular part into which the holder is inserted.

With this configuration, the cover member can be mounted so as to cover a part of the holder. According to the configuration above, the ease of mounting of the cover member on the holder can be improved.

In the vehicle seat above, the annular part may have a positioning portion in contact with the seat back frame.

With this configuration, a rattle of the cover member can be suppressed. According to the configuration above, the cover member is easily disposed at a predetermined position on the seat back frame.

In the vehicle seat above, the cover member may have at least one opening on a front face.

With this configuration, the mounting state of the cover member is easily confirmed. That is, according to the configuration above, the states of the holder and the guide on the inner side of the cover member are easily confirmed.

In the vehicle seat above, the cover member may have a plurality of the openings arranged in a seat width direction.

With this configuration, the mounting states of both of the right and left cover members are easily confirmed.

In the vehicle seat above, the cover member may have an engagement part engaged with the holder, and the engagement part may be provided at a position opposite to the opening.

With this configuration, the engagement state of the cover member with the holder is easily confirmed. According to the configuration above, the area near the engagement part is easily deformed, and hence the cover member is easily mounted on the holder.

In the vehicle seat above, the cover member may have at least one rib formed on an inner surface of the cover member, the at least one rib being in contact with the holder.

With this configuration, a rattle of the cover member can be suppressed. According to the configuration above, the positioning accuracy of the cover member can be improved.

According to the configuration above, the strength of the cover member can be improved.

Advantageous Effects of Invention

According to the present invention, the damage to the inner portion of the seat back caused by the mounting part of the headrest on the seat back in rear-end collision can be reduced.

According to an aspect of the present invention, in rear-end collision, the damage to the inner portion of the seat back caused by the end portion of the holder on the seat front side can be reduced.

According to an aspect of the present invention, in rear-end collision, the damage to the inner portion of the seat back caused by the lower end of the guide can be reduced.

According to an aspect of the present invention, a rattle of the cover member can be suppressed.

According to an aspect of the present invention, the ease of mounting of the cover member on the holder can be improved.

According to an aspect of the present invention, the cover member is easily disposed at a predetermined position on the seat back frame.

According to an aspect of the present invention, the mounting state of the cover member is easily confirmed.

According to an aspect of the present invention, the mounting states of both of the right and left cover members are easily confirmed.

According to an aspect of the present invention, the engagement state of the cover member with the holder is easily confirmed.

According to an aspect of the present invention, a rattle of the cover member can be suppressed.

DESCRIPTION OF EMBODIMENTS

In the following, a vehicle seat S according to an embodiment of the present invention (in the following, the embodiment) will be described with reference to FIGS. 1 to 15.

Figure 1:
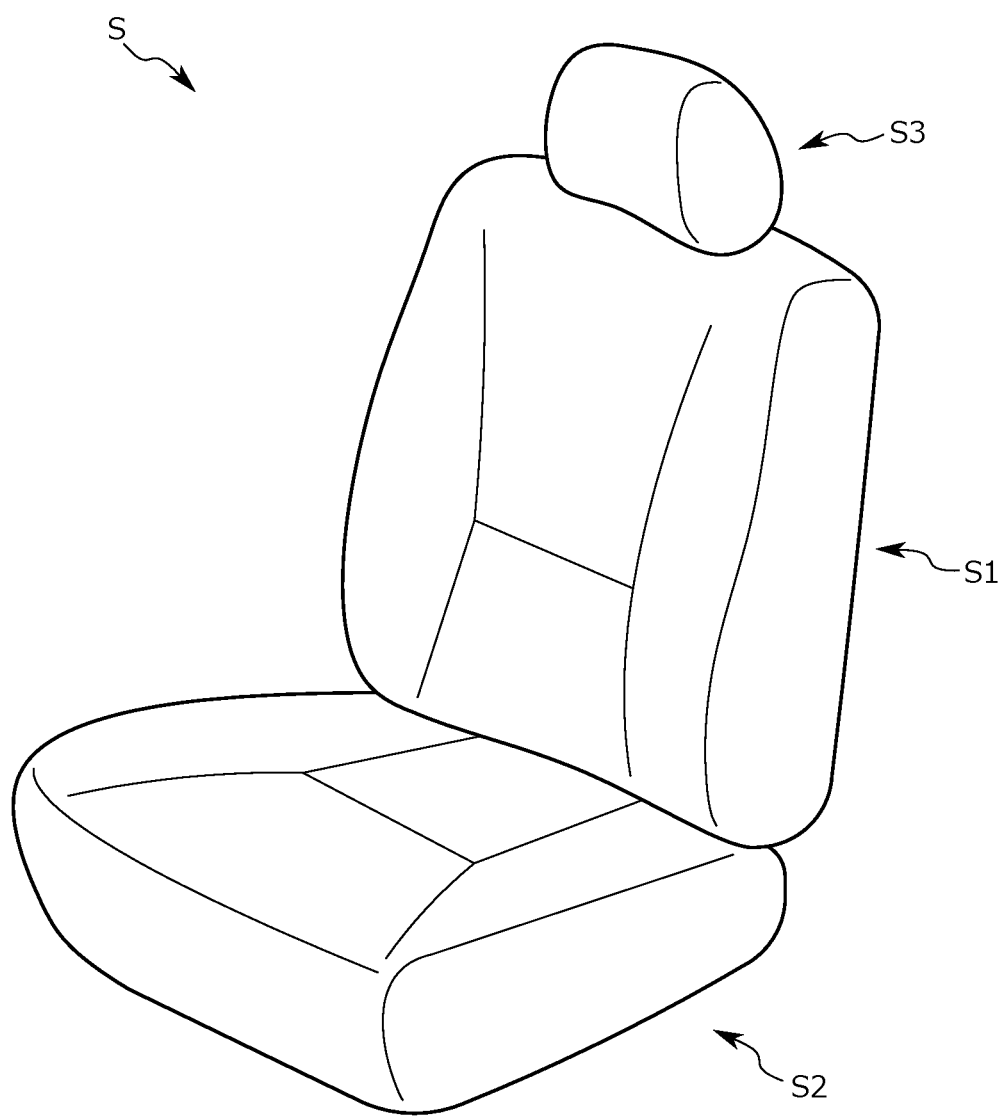
FIG. 1 is a perspective view of a vehicle seat according to an embodiment.
Figure 2:
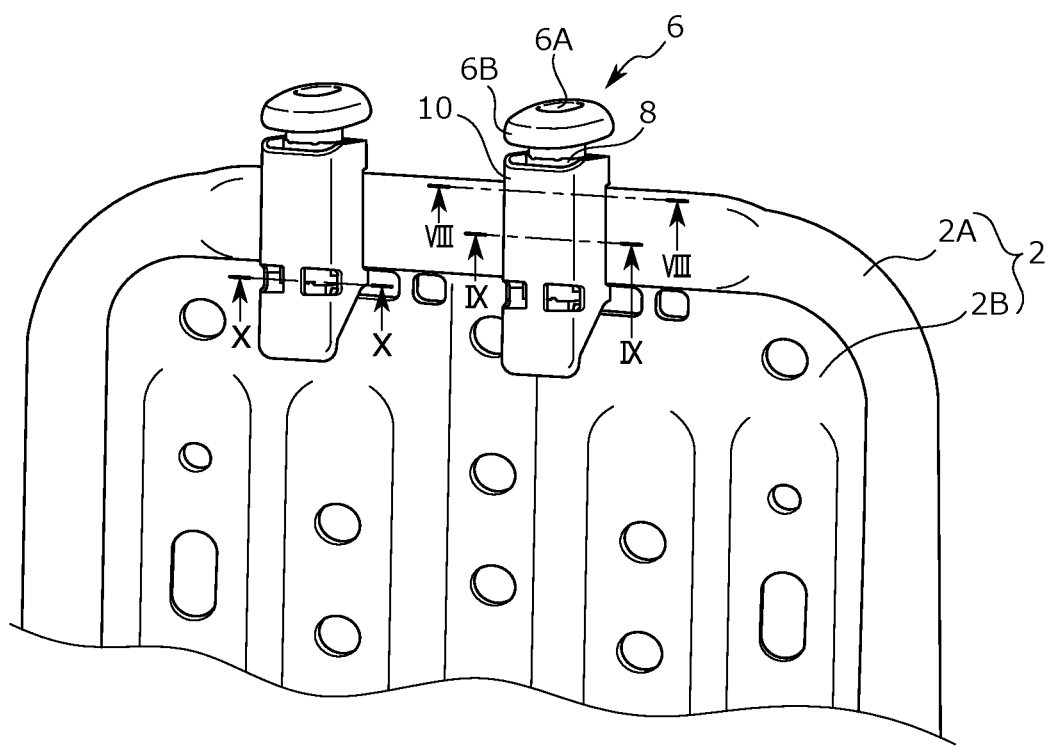
FIG. 2 is a perspective view of the upper portion of a seat back frame.
Figure 3:
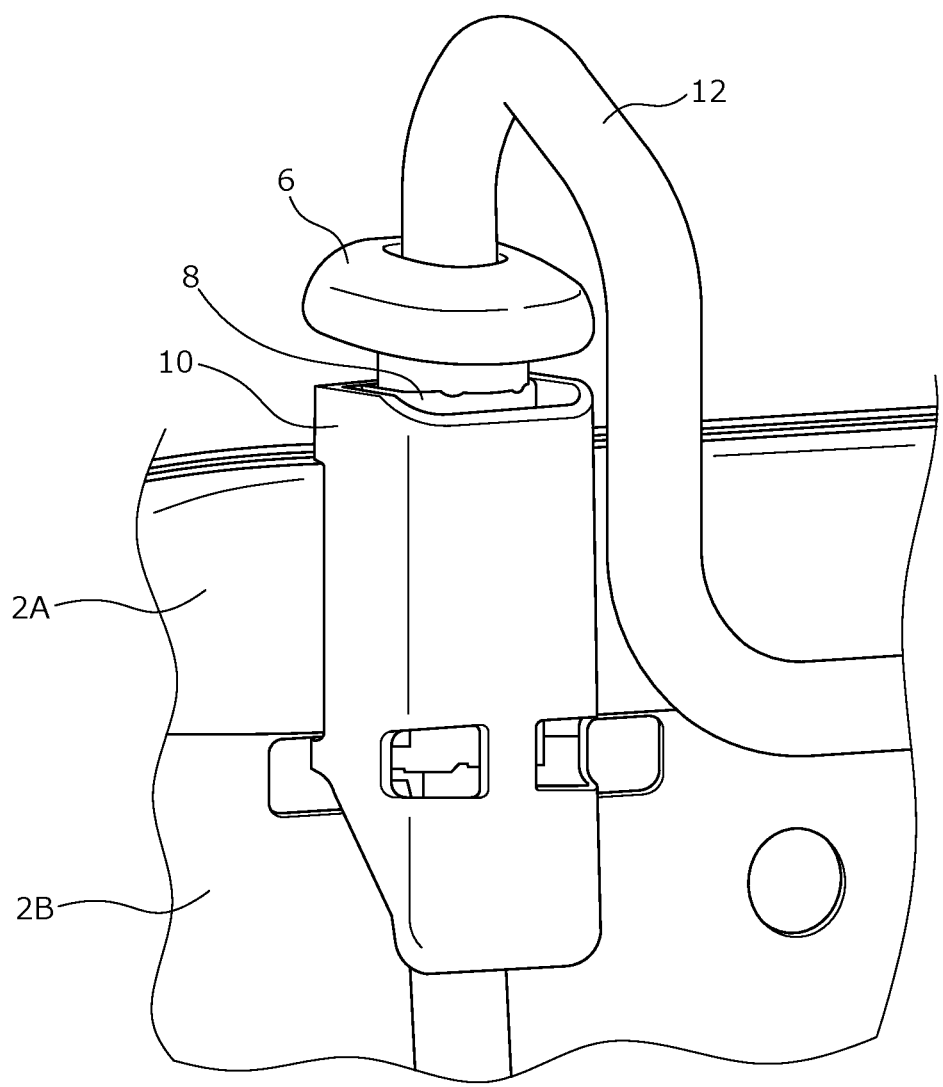
FIG. 3 is a diagram illustrating the mounting state of a headrest stay on the seat back frame.

FIG. 1 is a perspective view of the vehicle seat S according to the embodiment. FIG. 2 is a perspective view of the upper portion of a seat back frame 2 forming the skeletal frame of a seat back S1 of the vehicle seat S. FIG. 3 is a diagram illustrating the mounting state of a headrest stay 12 on the seat back frame 2.

Figure 4:
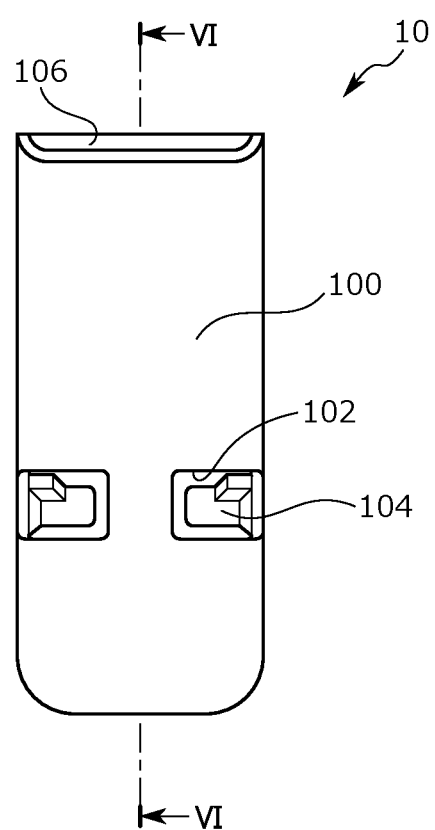
FIG. 4 is a front view of a cover member.
Figure 5:
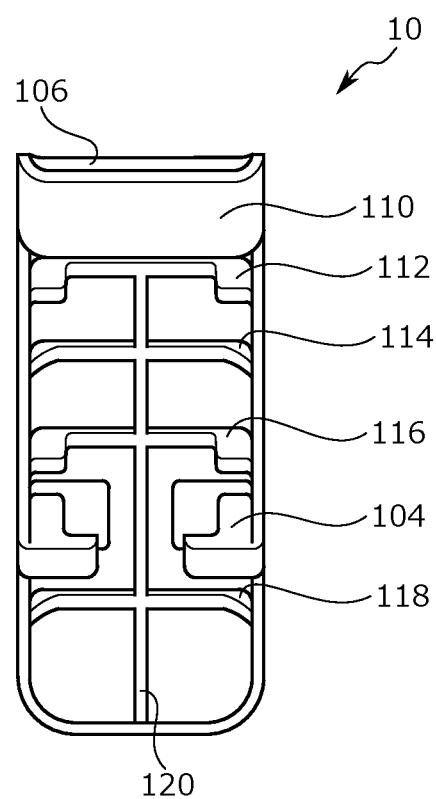
FIG. 5 is a rear view of the cover member.
Figure 6:
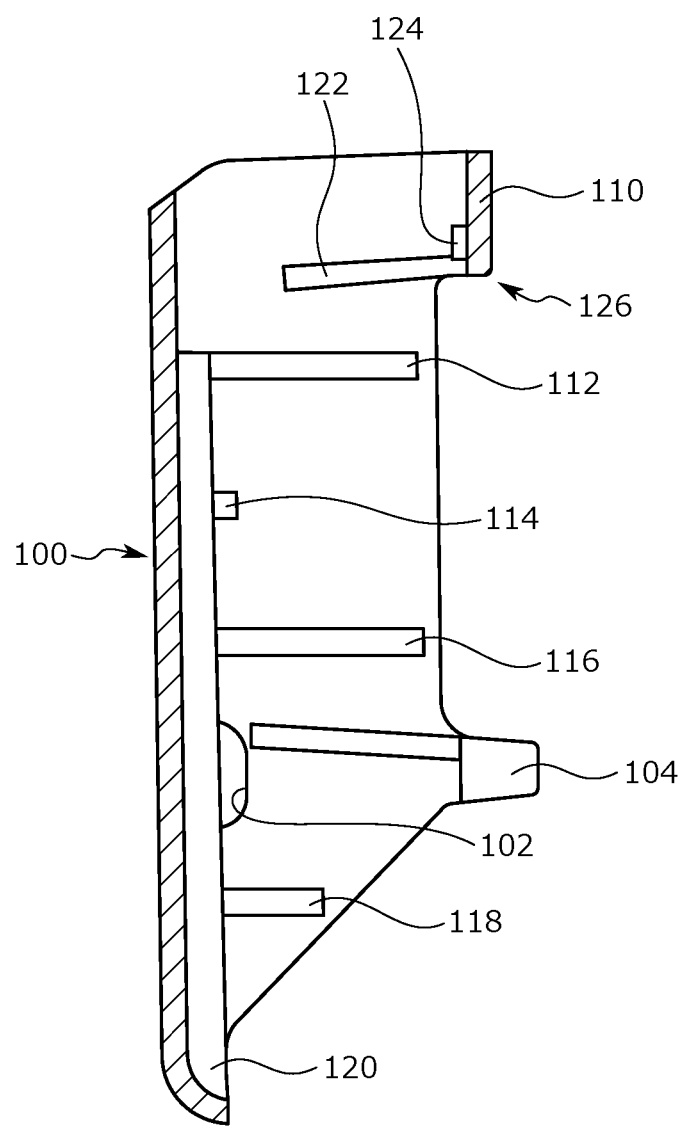
FIG. 6 is a cross-sectional view of the cover member taken along line VI-VI.
Figure 7:
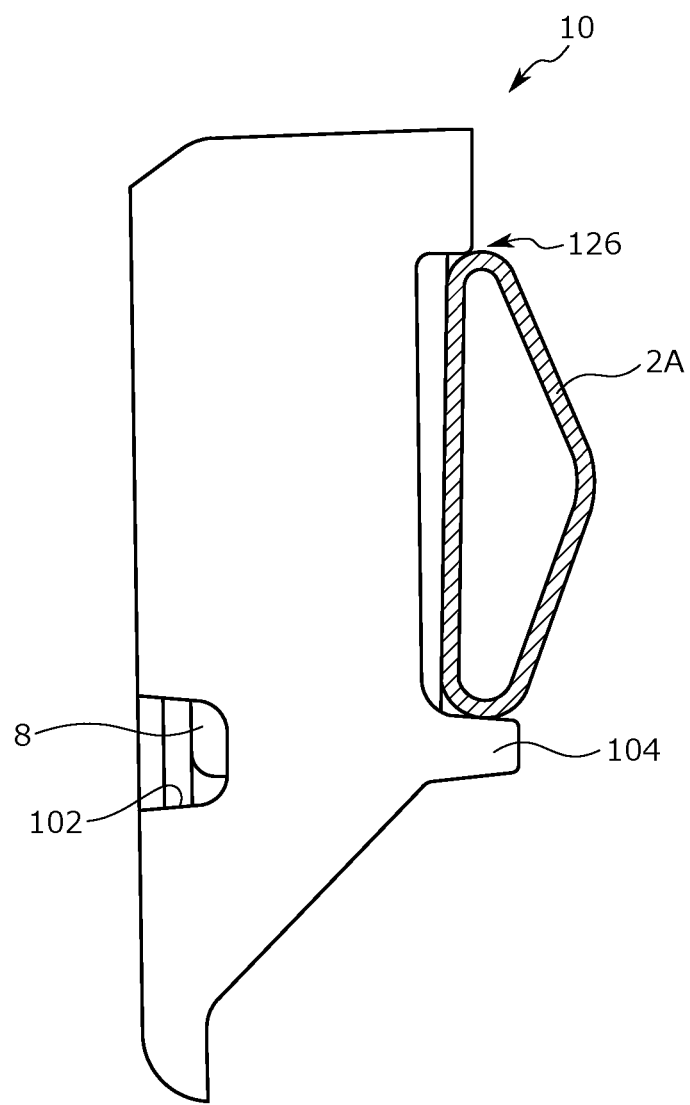
FIG. 7 is a side view of the cover member.

FIG. 4 is a front view of a cover member 10 according to a first embodiment. FIG. 5 is a rear view of the cover member 10. FIG. 6 is a cross-sectional view of the cover member 10 taken along line VI-VI. FIG. 7 is a side view of the cover member 10.

Figure 8:
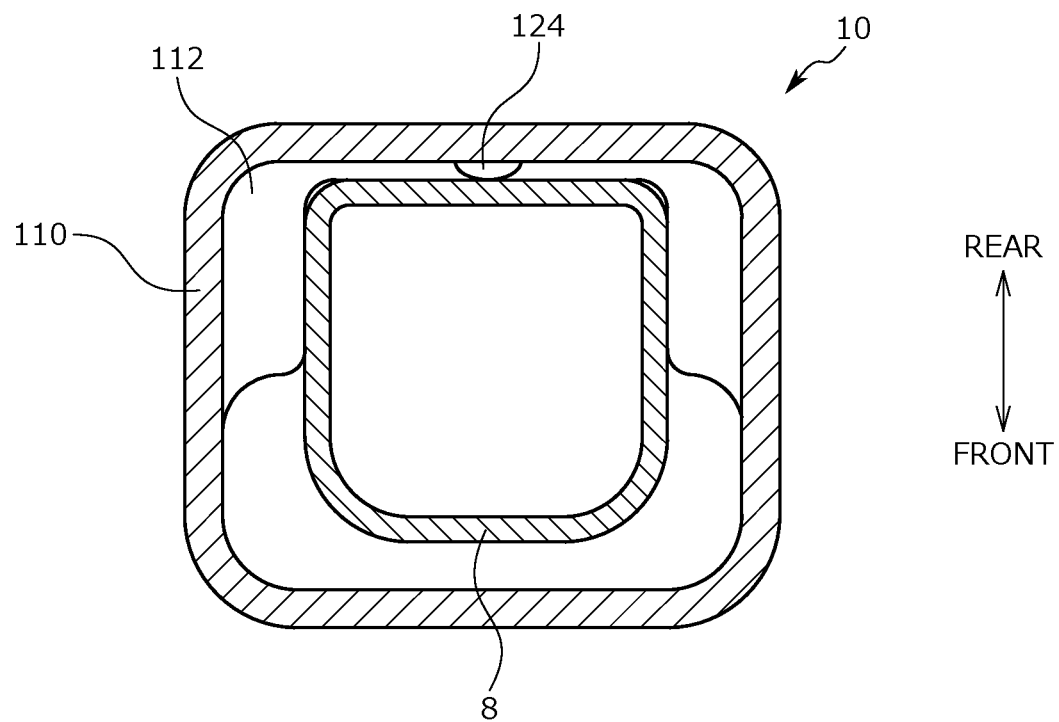
FIG. 8 is an end view taken along line VIII-VIII with the cover member mounted on a holder.
Figure 9:
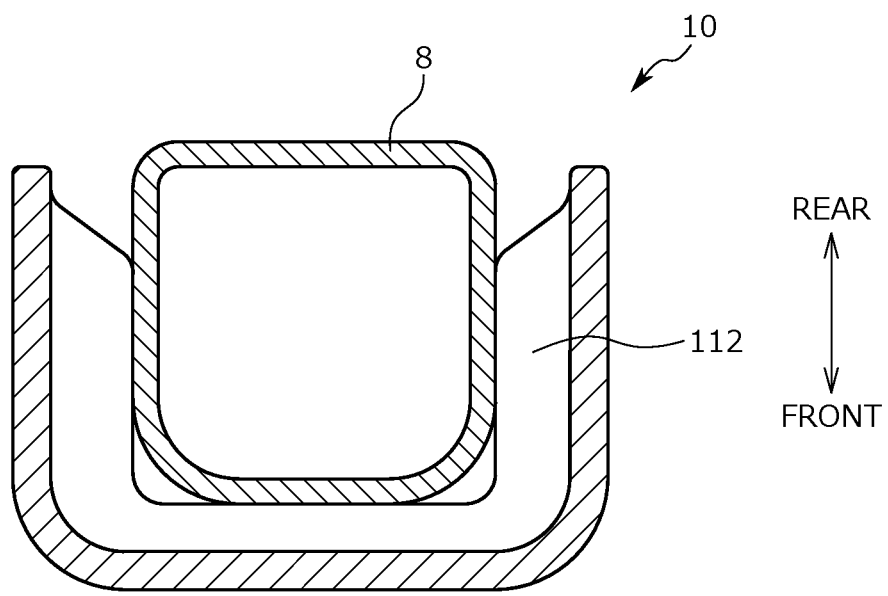
FIG. 9 is an end view taken along line IX-IX with the cover member mounted on the holder.
Figure 10:
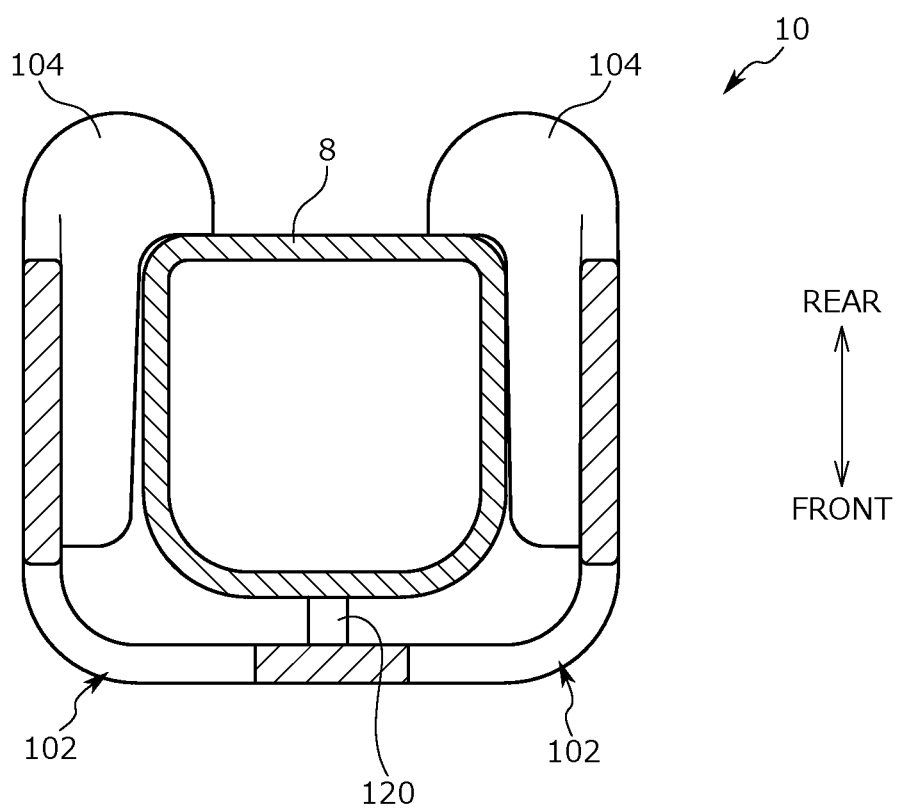
FIG. 10 is an end view taken along line X-X with the cover member mounted on the holder.

FIG. 8 is an end view taken along line VIII-VIII with the cover member 10 mounted on a holder 8. FIG. 9 is an end view taken along line IX-IX with the cover member 10 mounted on the holder 8. FIG. 10 is an end view taken along line X-X with the cover member 10 mounted on the holder 8.

Figure 11:
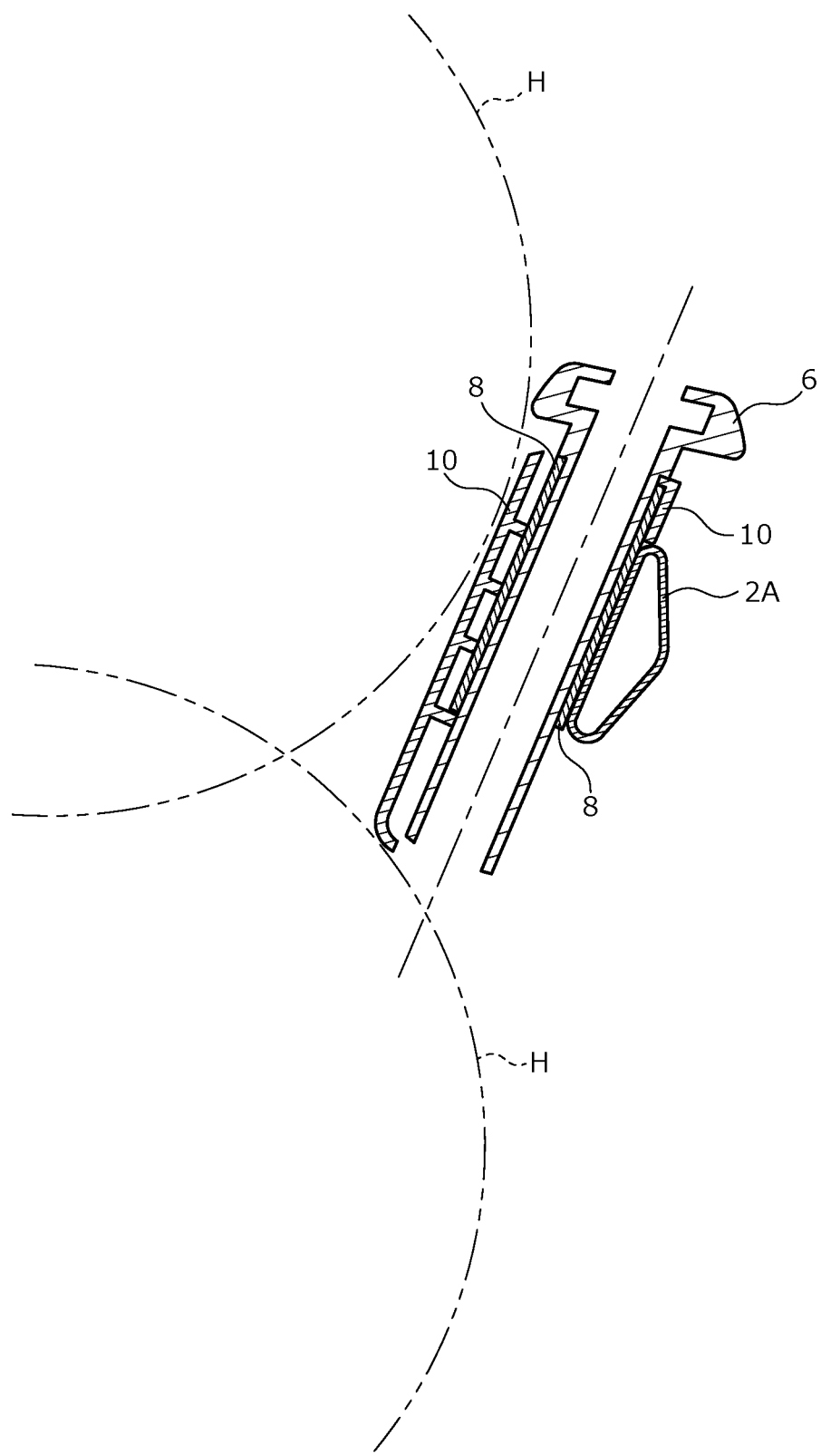
FIG. 11 is a cross-sectional view illustrating the positional relationship between an occupant's head, a headrest guide, and the holder with the cover member.

FIG. 11 is a cross-sectional view illustrating the positional relationship between a contact range H, a headrest guide 6, and the holder 8 with the cover member 10. Note that FIG. 11 shows the cross-sectional shape of a main pipe 2A joined to the holder 8.

Figure 12:
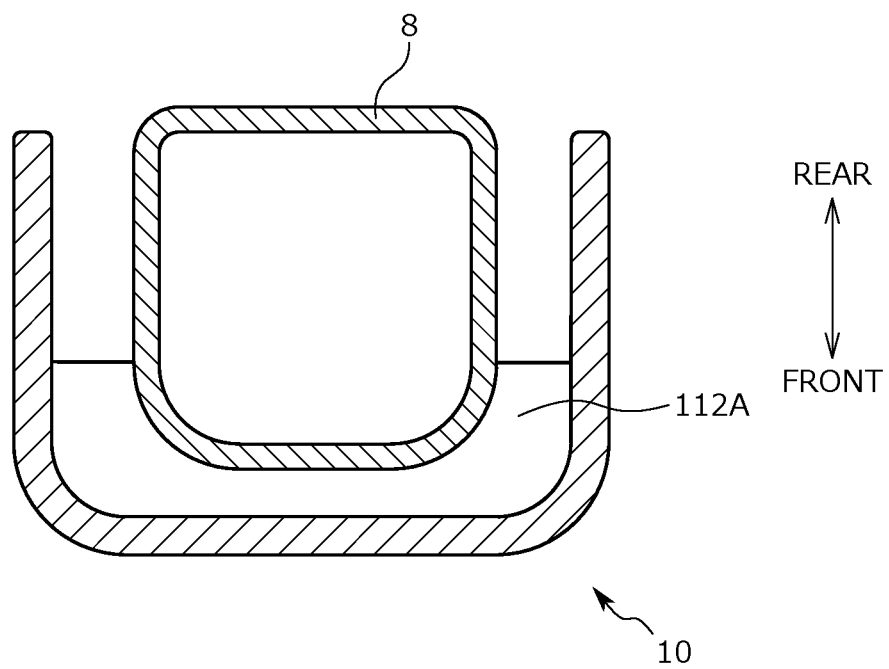
FIG. 12 is an end view taken along line IX-IX illustrating the shape of a rib included in a cover member according to a first exemplary modification.
Figure 13:
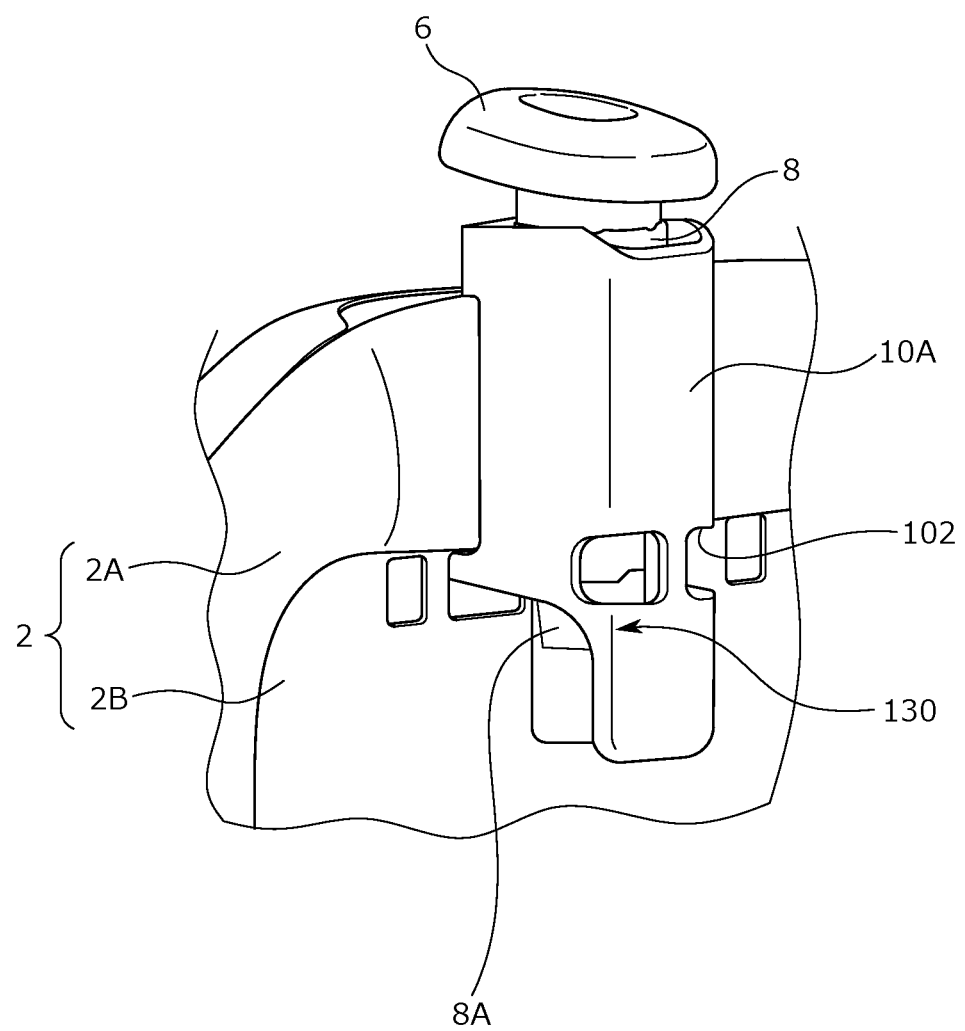
FIG. 13 is a perspective view of a second exemplary modification with the cover member mounted on the holder.

FIG. 12 is an end view taken along line IX-IX illustrating the shape of a rib included in the cover member 10 according to the first exemplary modification. FIG. 13 is a perspective view of a second exemplary modification with the cover member mounted on the holder.

Figure 14:
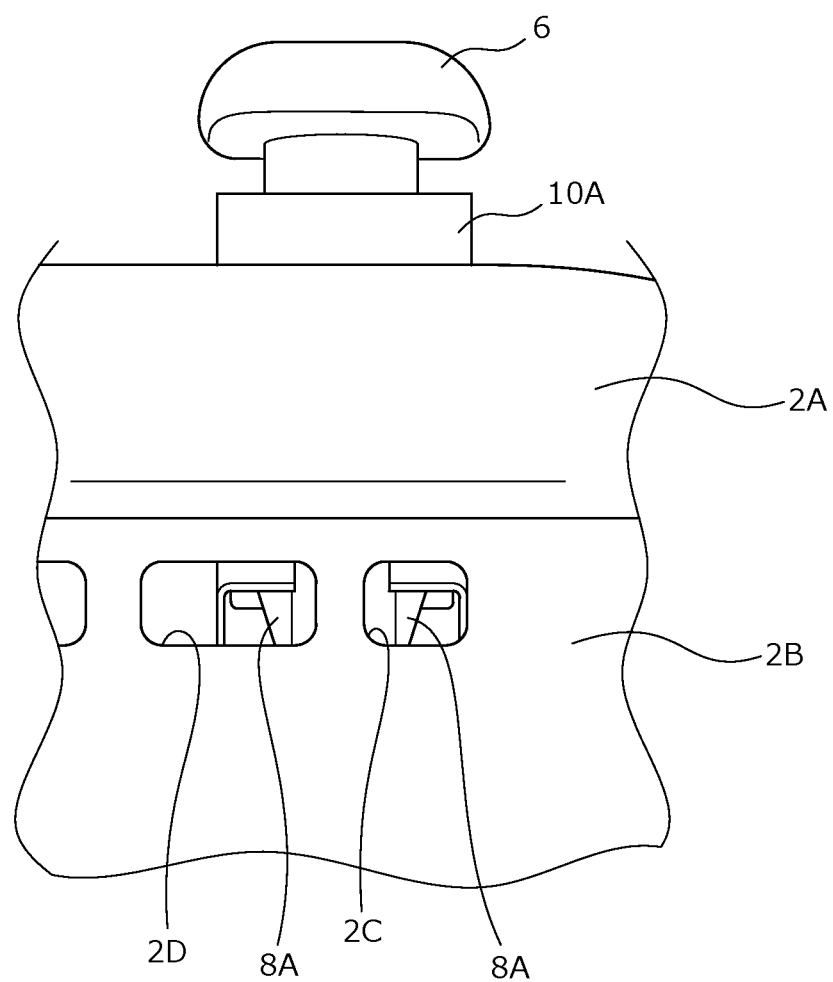
FIG. 14 is a rear view of a part of a pan frame.
Figure 15:
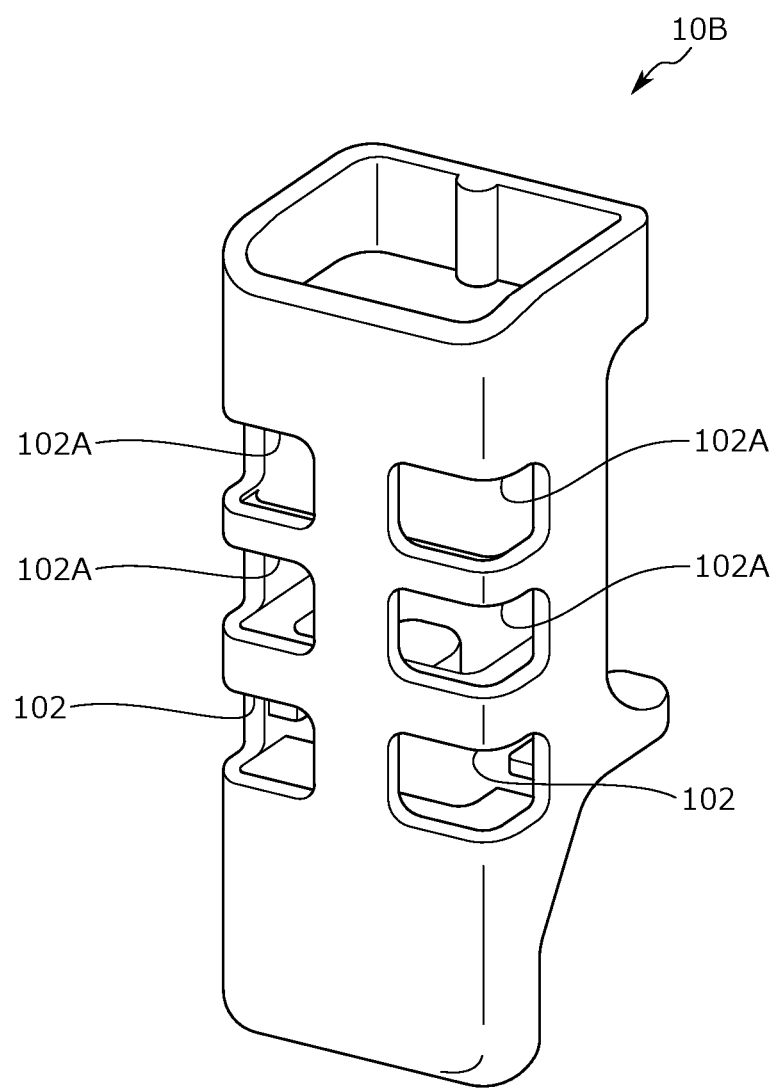
FIG. 15 is a perspective view of a cover member according to a third exemplary modification.

FIG. 14 is a rear view of a part of a pan frame 2B constituting the seat back frame 2. FIG. 15 is a perspective view of a cover member 10B according to a third exemplary modification.

As shown in FIG. 1, the vehicle seat S includes the seat back S1 that is a backrest part, a seat cushion S2 that is a seating part, and a headrest S3 that is disposed on the upper portion of the seat back S1 and supports an occupant's head.

Note that in the following description, the term "front to back direction" means the front to back direction when viewed from a seated person on the vehicle seat S, and the front to back direction is the direction matched with the traveling direction of a vehicle. The term "seat width direction" means the lateral width direction of the vehicle seat, and is matched with the right and left direction when viewed from the seated person on the vehicle seat S. The term "vertical direction" means the height direction of the vehicle seat S, and is matched with the vertical direction when the vehicle seat is viewed from the front.

As shown in FIG. 2, the seat back frame 2 forming the skeletal frame of the seat back S1 has the main pipe 2A and the pan frame 2B that are main components. Here, the main pipe 2A is a tubular body nearly in a U-shape constituting the outer frame of the seat back frame 2, and the pan frame 2B is a plate-shaped body disposed on the inner side of the main pipe 2A and coupled to the inner circumference of the main pipe 2A.

On the headrest S3, two headrest stays 12 are provided hanging down from the lower portion of the headrest S3.

As shown in FIGS. 7 and 11, to the main pipe 2A that is the upper portion of the frame, the holder 8 joined by welding. Specifically, the front face of the main pipe 2A is joined to the rear face of the holder 8 by welding. Note that the holder 8 is a tubular body provided with an opening on its top and bottom, and the headrest guide 6 is inserted into the holder 8. Thus, the headrest guide 6 is mounted on the seat back frame 2.

As shown in FIGS. 2, 3, and 11, the headrest guide 6 is a tubular body provided with an insertion hole 6A into which the headrest stay 12 is inserted. On the upper portion of the headrest guide 6, a head 6B is provided. The head 6B has an outer diameter larger than the diameter of the openings of the holder 8 and the cover member 10. Thus, the headrest guide 6 is prevented from falling through to the lower side of the holder 8 and the cover member 10.

The headrest stays 12 of the headrest S3 are each inserted into the insertion hole 6A of the headrest guide 6 mounted on the seat back frame 2, and held on the seat back frame 2. With the configuration described above, the headrest S3 is mounted on the seat back S1.

Here, the headrest guide 6 and the holder 8 are formed of a metal member of high strength in order to maintain the holding strength of the headrest S3 and suppress a rattle. In this case, the positions of the headrest guide 6 and the holder 8 correspond to the position of the head or neck of an occupant who is seated on the vehicle seat S, and the occupant sometimes feels uncomfortable due to the presence of hard members in the inside of the seat back S1. In rear-end collision, the edges of the headrest guide 6 and the holder 8 might damage the cushion material in the inside of the seat back S1.

Therefore, the vehicle seat S according to the embodiment is provided with the cover member 10 that covers at least a part of the outer surfaces of the headrest guide 6 and the holder 8.

That is, as shown in FIGS. 1 to 3, the vehicle seat S according to the embodiment is characterized by the headrest guide 6 having the insertion hole 6A into which the headrest stay 12 of the headrest S3 is inserted, the holder 8 mounted on the seat back frame 2 and configured to hold the headrest guide 6, and the cover member 10 covering at least a part of the outer surfaces of the headrest guide 6 and the holder 8 and detachable from the seat back frame 2. In the following, the configuration of the cover member 10 and the mounting structure of the cover member 10 on the seat back frame 2 will be described in detail. Note that the cover member 10 may be a member integrally formed of a synthetic resin, for example.

As shown in FIGS. 3, 4, and 11, a front face portion 100 of the cover member 10 has a region covering the top end and the lower end of the holder 8 on the seat front side and further covering the lower end of the headrest guide 6 on the seat front side.

As shown in FIG. 4, the front face portion 100 of the cover member 10 is formed with two openings 102 side by side in the seat width direction. The opening 102 is provided at almost the same position as the position of an engagement part 104 extending to the seat rear side in the seat vertical direction. The opening 102 is provided at almost the same height as the height of the lower end of the holder 8 in the vertical direction.

Here, as shown in FIG. 10, the opening 102 is formed across the lateral side of a center rib 120 and the corner of the cover member 10 on the front side. As described above, the opening 102 is formed at the corner, and hence the mounting state of the holder 8 is easily viewed from the opening 102. The opening 102 is provided at almost the same position as the position of the engagement part 104 in the vertical direction, and the opening 102 is formed near the engagement part 104 on the seat front side. Thus, the place where the engagement part 104 is located is easily elastically deformed. Therefore, the engagement part 104 is easily mounted on the holder 8.

As shown in FIGS. 5, 6, and 10, the engagement part 104 is formed in a hook shape. The engagement part 104 is connected to the lateral inner side of the side face of the cover member 10 in the seat width direction, and has a wide shape to the seat rear side. The holder 8 is disposed between the engagement parts 104 opposite to each other, the engagement parts 104 are in contact with the holder 8, and hence the positional displacement between the holder 8 and the cover member 10 in the right and left direction and a rattle are suppressed.

As shown in FIGS. 4 to 6, on the upper portion of the cover member 10, an annular part 110 is formed. As shown in FIGS. 2, 3, and 11, the headrest guide 6 and the holder 8 are inserted into an upper opening 106 on the inner side of the annular part 110, and the cover member 10 covers at least apart of the outer surfaces of the headrest guide 6 and the holder 8.

As shown in FIG. 8, on the seat rear side of the annular part 110, a rib 122 is formed, and the rib 122 is contacted with the side portion of the holder 8. On the center of the inner face of the annular part 110 on the seat rear side, a rib 124 in a shape protruding to the seat front side is formed, and the rib 124 is in contact with the rear portion of the holder 8. With this configuration, the positional displacement between the upper portion of the holder 8 and the cover member 10 in the right and left direction and a rattle are suppressed.

As shown in FIGS. 5 and 6, on the inner surface of the cover member 10, a rib 112, a rib 114, a rib 116, and a rib 118 extending in the seat width direction and the center rib 120 extending in the seat vertical direction are formed.

The rib 112, the rib 114, the rib 116, and the rib 118 are formed in a protruding shape from the rear face side (the inner face side) of the front face portion 100. Here, as shown in FIG. 9, the rib 112 is in contact with the front face and the side face of the holder 8. Similarly, the rib 116 is also in contact with the front face and the side face of the holder 8. The rib 114 and the rib 118 are in contact with the front face of the holder 8. A plurality of ribs is provided on the inner surface of the cover member 10, and hence the positional displacement between the upper portion of the holder 8 and the cover member 10 and a rattle are suppressed.

As shown in FIGS. 5 and 6, the rib 112, the rib 114, the rib 116, and the rib 118 are coupled to the center rib 120 at the center part in the seat width direction. The center rib 120 is in contact with the front face of the holder 8.

As described above, the plurality of ribs and the engagement part 104 formed on the inner surface side of the cover member 10 are in contact with the holder 8, and hence the positional displacement between the holder 8 and the cover member 10 and a rattle of the cover member 10 can be suppressed.

As shown in FIG. 7, between the annular part 110 and the engagement part 104 of the cover member 10, the main pipe 2A is disposed, and a positioning portion 126 that is the lower end of the annular part 110 is in contact with the main pipe 2A. Thus, the positional displacement of the cover member 10 to downward is restrained, and the cover member 10 is prevented from falling through below the lower side of the holder 8.

As described above, the vehicle seat S includes the cover member 10, and hence as shown in FIG. 11, the distance from the contact range H of the occupant to the headrest guide 6 and the holder 8 is kept at a certain distance or more.

With this configuration, control is feasible such that the head 6B and the edge of the lower portion of the headrest guide 6 and the edge of the upper portion and the lower portion of the holder 8 do not touch the contact range H.

In the vehicle seat S including the cover member 10, the damage to the inner portion of the seat back S1 in rear-end collision can be reduced; the damage is caused by the headrest guide 6 and the holder 8 that are the mounting unit mounting the headrest S3 on the seat back S1. In the above-described vehicle seat S, the uncomfortable feeling on the occupant's head or neck in contact with the seat back S1 provided with the headrest stays 12 can be reduced.

The cover member 10 is detachable from the seat back frame 2, and hence the easy replacement of the cover member 10 can be improved.

The cover member 10 is provided with the plurality of ribs and the engagement parts 104 in contact with the holder 8, and hence a rattle of the cover member 10 can be suppressed.

The present invention is non-limiting to the foregoing embodiment, and can be variously modified. Here as an example, a first exemplary modification and a second exemplary modification of the cover member 10 will be described. In the first exemplary modification of the cover member 10, the shape of the rib provided on the inner surface of the cover member 10 is different from the foregoing embodiment.

FIG. 12 shows the shape of a rib provided on the inner surface of the cover member 10 according to the first exemplary modification. Note that in the foregoing embodiment, an example is shown in which the rib 112 extends to the rear end of the cover member 10. However, in the first exemplary modification, as shown in FIG. 12, a rib 112A does not extend to the rear end of the cover member 10, and the rib 112A may have a shape extending to such a position that the rib 112A can be in contact with the front corners of the holder 8. Of course, the shape of the rib shown in FIG. 12 may be similarly applied to the rib 114, the rib 116, and the rib 118, for example.

Next, the second exemplary modification of the cover member 10 will be described. FIG. 13 shows a perspective view of a cover member 10A according to the second exemplary modification mounted on the seat back frame 2. As shown in FIG. 13, the cover member 10A according to the second exemplary modification is different from the cover member 10 in that a notch portion 130 is formed on the edge portion from the lower end of the front face portion 100 to the engagement part 104.

In the cover member 10A according to the second exemplary modification, the notch portion 130 is provided, and hence a nail portion 8A of the holder 8 can be exposed from the cover member 10A. The nail portion 8A is engaged with the lower end of the headrest guide 6. The nail portion 8A is pushed into the inside of the headrest guide 6, and then the holder 8 can be removed from the headrest guide 6. As described above, in the cover member 10A according to the second exemplary modification, the nail portion 8A is exposed from the cover member 10A, and hence pushing the nail portion 8A is made easy.

The nail portion 8A can be pushed through the opening 102 provided on the front face portion 100 of the cover member 10A.

As shown in FIG. 14, a configuration may be provided in which on the pan frame 2B, an opening 2C and an opening 2D are provided and the nail portion 8A is pushed through the opening 2C and the opening 2D.

FIG. 15 shows a perspective view of a cover member 10B according to a third exemplary modification. The cover member 10B according to the third exemplary modification is different from the cover member 10 in that six openings are provided on the front face portion 100. That is, the cover member 10B is different from the cover member 10 in that four openings 102A are provided in addition to the openings 102. Note that a pair of the openings 102A may be formed between the rib 112 and the rib 114 and between the rib 114 and the rib 116.

In the foregoing embodiment, the annular part 110 is a continuous annular shape. However, a part of the annular part 110 may be cut. That is, the annular part 110 may have a shape, such as a nearly U-shape and a nearly C-shape.

In the foregoing embodiment, an example is described in which the cover members 10 (including the cover member 10A and the cover member 10B) on the right and left are configured as separate members. However, the right and left cover members 10 may be integrally configured. A configuration may be provided in which the cover member 10 the front face portion 100 of the cover member 10 extends so as to cover the lower end of the headrest stay 12.

REFERENCE SIGNS LIST

H: Contact range
S: Vehicle seat
   S1: Seat back
   S2: Seat cushion
   S3: Headrest
2: Seat back frame
   2A: Main pipe
   2B: Pan frame
   2C: Opening
   2D: Opening
6: Headrest guide
   6A: Insertion hole
   6B: Head
8: Holder
   8A: Nail portion
10: Cover member
10A: Cover member (second exemplary modification)
10B: Cover member (third exemplary modification)
12: Headrest stay
100: Front face portion
102: Opening
102A: Opening
104: Engagement part
106: Upper opening
110: Annular part
112: Rib
112A: Rib
114: Rib
116: Rib
118: Rib
120: Center rib
122: Rib
124: Rib
126: Positioning portion
130: Notch portion

The invention claimed is:

1. A vehicle seat including a headrest and a seat back, the vehicle seat comprising:
   a guide having an insertion hole into which a stay of the headrest is inserted;
   a holder mounted on a seat back frame forming a skeletal frame of the seat back, the holder being configured to hold the guide and having at least one front corner; and a cover member configured to cover at least a part of an outer surface of the guide and an outer surface of the at least one front corner of the holder, the cover member being detachable from the seat back frame, wherein the cover member covers a lower end of the guide on a seat front side.

2. The vehicle seat according to claim 1, wherein the cover member has a region covering a top end to a lower end of the holder on a seat front side.

3. The vehicle seat according to claim 1, wherein the cover member is in contact with the guide.

4. The vehicle seat according to claim 1, wherein the cover member has an annular part on an upper portion of the cover member into which the holder is inserted, wherein a portion of the cover member below the annular part covers only a front face and a side face of the holder, not a back face of the holder.

5. The vehicle seat according to claim 4, wherein the annular part has a positioning portion in contact with the seat back frame.

6. The vehicle seat according to claim 1, wherein the cover member has a first opening on a front face.

7. The vehicle seat according to claim 6, wherein the cover member has a second opening, the first opening and the second opening are arranged in a seat width direction.

8. The vehicle seat according to claim 6, wherein the cover member has an engagement part engaged with the holder, and the engagement part is provided at a position opposite to the first opening.

9. The vehicle seat according to claim 1, wherein the cover member has at least one rib formed on an inner surface of the cover member, the at least one rib being in contact with the holder.

10. A vehicle seat including a headrest and a seat back, the vehicle seat comprising:
    a guide having an insertion hole into which a stay of the headrest is inserted;
    a holder mounted on a seat back frame forming a skeletal frame of the seat back, the holder being configured to hold the guide; and
    a cover member configured to cover at least a part of an outer surface of the guide and an outer surface of the holder, the cover member being detachable from the seat back frame and being formed of a material softer than that of the holder,
    wherein the cover member has an annular part on an upper portion of the cover member into which the holder is inserted, wherein a portion of the cover member below the annular part covers only a front face and a side face of the holder, not a back face of the holder.

11. A vehicle seat including a headrest and a seat back, the vehicle seat comprising:
    a guide having an insertion hole into which a stay of the headrest is inserted;
    a holder mounted on a seat back frame forming a skeletal frame of the seat back, the holder being configured to hold the guide and having at least one front corner; and
    a cover member configured to cover at least a part of an outer surface of the guide and an outer surface of the at least one front corner of the holder, the cover member being detachable from the seat back frame,
    wherein the cover member has an opening on a front face.

* * * * *